June 15, 1937.  M. OLLEY  2,083,661
SPRING SUSPENSION
Filed Aug. 5, 1935   3 Sheets-Sheet 1
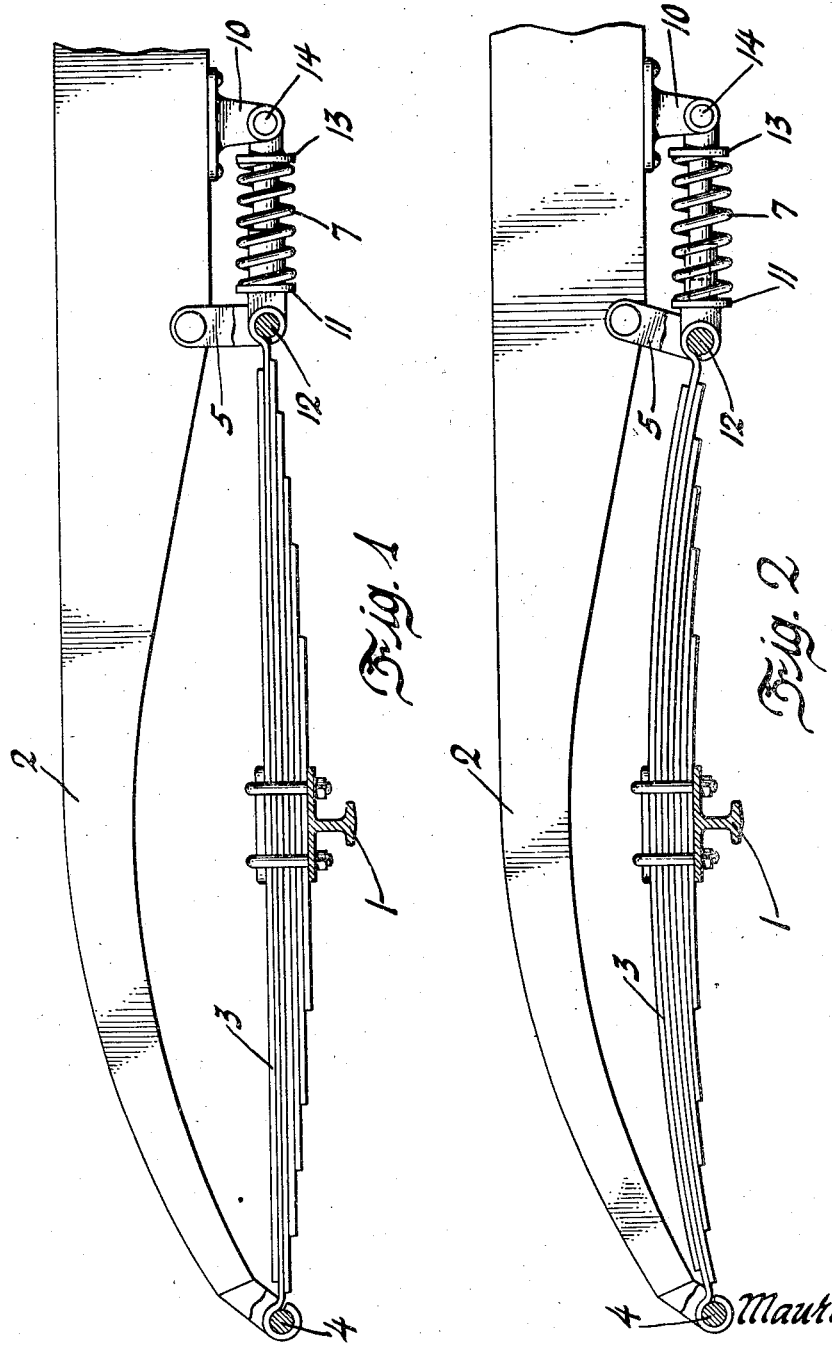
Inventor
Maurice Olley
By Blackmore, Spencer & Flint
Attorneys June 15, 1937.  M. OLLEY  2,083,661
SPRING SUSPENSION
Filed Aug. 5, 1935   3 Sheets-Sheet 2
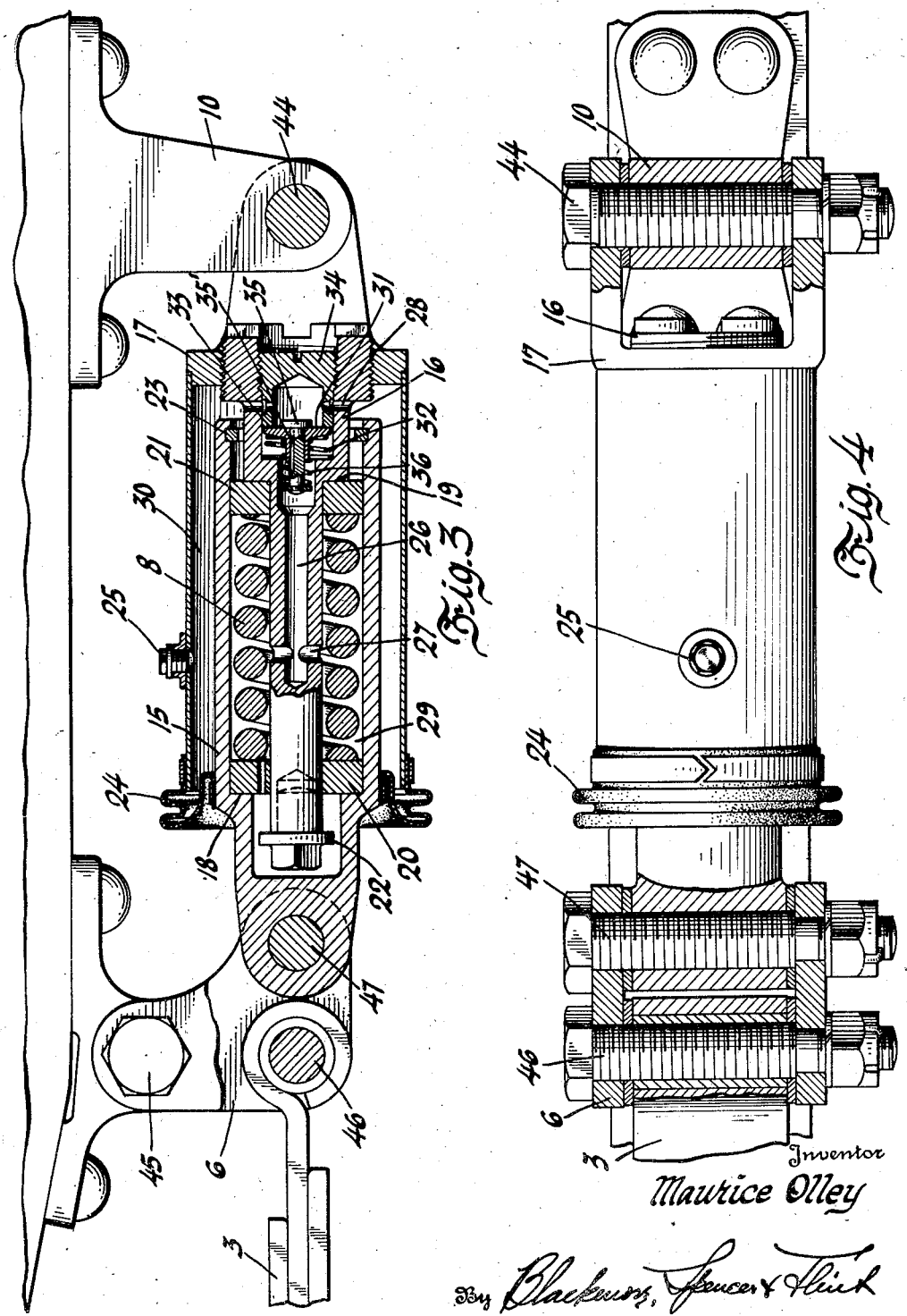
Inventor
Maurice Olley
By Blackmore, Spencer & Flink
Attorneys

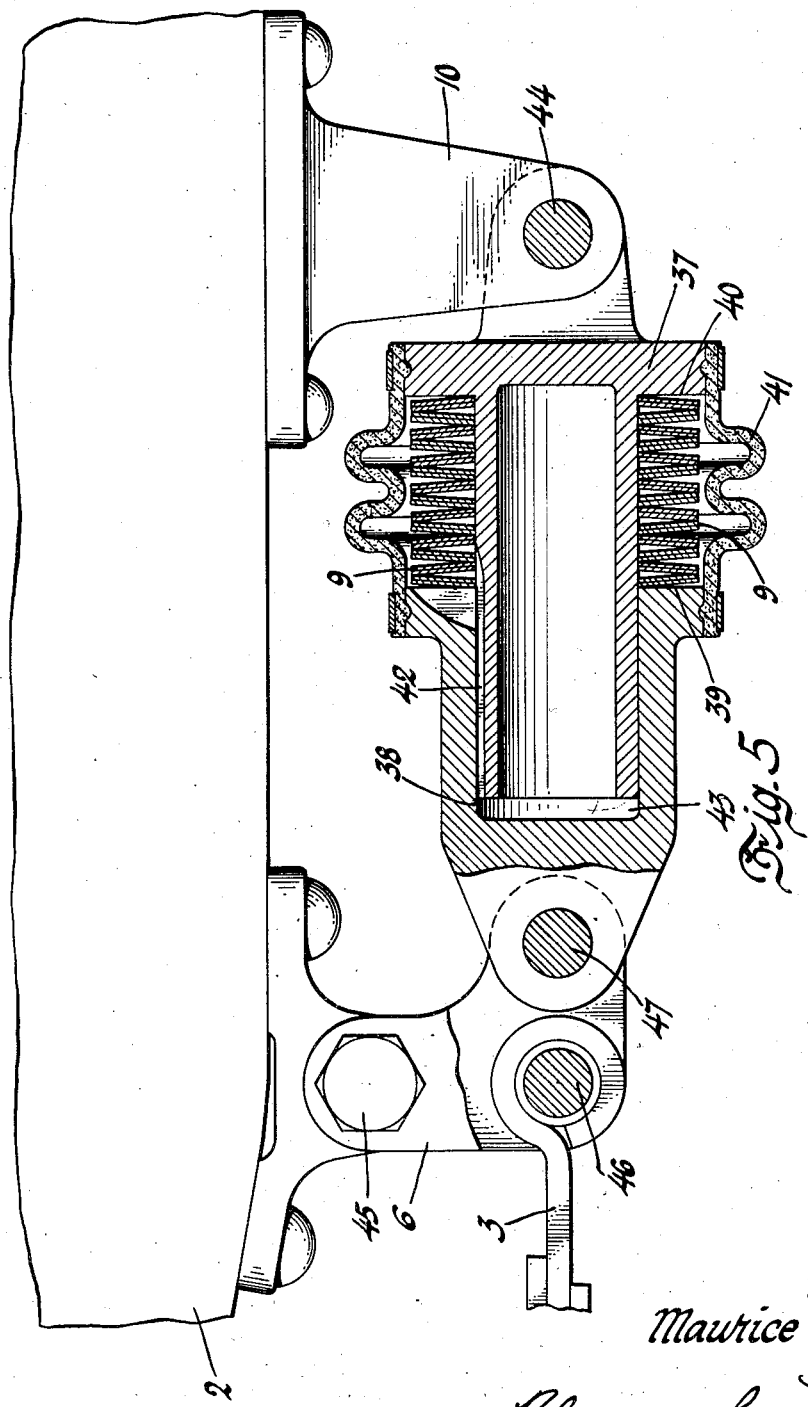

Patented June 15, 1937

2,083,661

UNITED STATES PATENT OFFICE 2,083,661

SPRING SUSPENSION

Maurice Olley, Detroit, Mich., assignor to General Motors Corporation, Detroit, Mich., a corporation of Delaware Application August 5, 1935, Serial No. 34,713

18 Claims. (Cl. 267—17)

This invention relates to springs suitable for vehicle suspension systems. It is concerned particularly with means for changing the load deflection characteristics of a spring by varying the effective rate (i. e., the change of load required for given incremental increases or decreases in deflection, or the extent to which the spring is deflected by equal incremental increases or decreases in load) in different parts of its working range.

It has long been known that the suspension of a vehicle should be stiff for stability and soft for riding comfort.

Other things being equal the roll stability of a vehicle or its resistance to roll about an axis longitudinally of the vehicle under the influence of centrifugal force acting on the vehicle when it is moving in a curved path as in cornering, is obviously lessened the softer the suspension.

A suspension which is soft in its normal position, and of which the effective "rate" (i. e., the change in load required for each inch of deflection of the spring), increases with deflections of the spring corresponding to both upward and downward motion of the wheels from their normal position, best fulfills the conflicting requirements of softness for riding comfort and stiffness for stability.

A spring of which the "rate" increases with deflections corresponding to both bump and rebound of the wheels relatively to the vehicle gives better roll stability than one in which the rate of the spring is increased only on bump deflections and remains unchanged for deflections corresponding to rebound of the wheel below the normal load position, because with the latter, when the vehicle rolls, there is increasing resistance to deflection of the wheel to the outside of the curve only, whereas with the former there is an increasing resistance to lifting of the vehicle relative to the wheel to the inside of the curve, in addition. A load deflection diagram of such a spring is S shaped and at and around the position of normal load gives a soft or low rate suspension which stiffens rapidly as the load is increased or relieved above or below normal.

A soft leaf spring in a conventional front suspension permits the axle to rotate too much when the brakes are applied.

In the case of a conventional leaf spring suspension for instance, there are practical difficulties in securing a "soft" suspension of sufficiently low rate for riding comfort. There are limitations in the thickness of the spring leaves and in the length and depth of the assembled spring which it is possible to use.

For these and other reasons the suspension systems of motor vehicles—which in the past have been almost exclusively of the leaf spring type—have heretofore been comparatively stiff, providing reasonable stability, but only poor riding comfort because of their small deflection for a given load, resulting in oscillations of too high a frequency under the influence of forces acting at the road wheels.

The general object of the invention is a spring means in which a comparatively stiff or high rate spring is used with means reducing the effective rate of the spring in its normal load position and at the same time increasing the rate of the suspension towards either end of the spring travel.

Another object of the invention is a spring means of variable rate which is adjustable.

A further object of the invention is to attain the first object of the invention with a spring means in which, with extreme deflections of the spring in either direction away from normal, the inherent rate thereof is increased by the same means used for reducing its effective rate at lesser deflections.

The above and other objects of the invention will be apparent as the description proceeds.

There is a considerable advantage to be obtained from a spring suspension of the foregoing character, since the effective rate can be varied within very wide limits over the range of deflection, and this can be done without materially reducing the ability of the stiff main spring to resist the forces due to braking.

According to the invention, a spring or a part movable therewith, upon deflection of the spring, forms one link of a toggle joint of which the other link is loaded by auxiliary spring means. The toggle is "straight" in the normal load position of the main suspension spring, and the auxiliary spring is so arranged that it exerts a maximum pressure on the toggle joint axially of the links, thereby softening or reducing the rate of the spring when the toggle is straight, and a reducing pressure as the two links of the toggle move into positions of increasing angular relationship to each other. The rate of the combination of main and toggle springs just before the toggle spring loses its compression is actually greater than the normal rate of the main spring itself, although of course as soon as the toggle spring completely loses its compression the rate of the combination becomes that of the original main spring.

In those cases where a maximum rate variation is required and where the inherent rate of the spring is required to be increased over a further range of extreme deflection, the auxiliary spring may be arranged to pass through a condition in which it exerts no pressure on the toggle joint to a condition in which it exerts a pressure in an opposite direction on the toggle joint, increasingly resisting movement of the links thereof into positions of increasing angular relationship and thereby adding to the stiffness of the spring and continuing or still further increasing the higher rates at the end of the spring travel.

The drawings show various applications of the invention to a vehicle suspension system in which a leaf spring or its equivalent constitutes one "link" of the toggle.

In the drawings,

Figure 1 is a side elevation of one end of a vehicle frame having the front axle resiliently supported on the frame in the conventional manner by a pair of leaf springs, and to which the invention, in its simplest form, has been applied. One spring and its associated parts with the auxiliary spring means, according to the invention, are shown in normal load position.

Figure 2 is similar to Figure 1, but shows the position of the parts when deflected by additional load.

Figures 3 and 4 show in part sectional views, in elevation and plan respectively, a practical design of auxiliary spring controlling means, suitable for actual installation. In this design, the auxiliary spring assists the deflection of the leaf spring upwards or downwards from its normal position to a lessening extent with increasing deflection until at approximately half the permitted axle deflection, it opposes the deflection of the spring to an increasing extent with increasing deflection.

Figure 5 is an elevation in part section of an arrangement in which the auxiliary spring means is provided by a multiplicity of springs of the Belleville washer type.

In all the examples illustrated, the leaf spring is flat at normal load and the auxiliary spring means is a compression spring compressed to a maximum at normal load position of the parts.

The leaf spring becomes bowed upwardly and downwardly with loads greater and less than normal, respectively.

The wheel axle 1 is resiliently supported on the vehicle frame 2 through the medium of leaf springs such as 3. The front end of the spring 3 is pivoted to the vehicle frame by a pin 4 and the rearward end is shackled to the frame by a shackle 5 in Figures 1 and 2 and by a shackle 6 in Figures 3, 4 and 5.

The leaf spring 3 constitutes one link of a toggle of which the other is the auxiliary spring means which is the coil spring 7 of Figures 1 and 2, the coil spring 8 of Figure 3 or the Belleville washer springs 9 of Figure 5.

The reaction of the auxiliary spring means is transmitted to the vehicle frame through a bracket 10.

The auxiliary spring means works between seatings mounted on or forming part of members pivotally connected to the end of the leaf spring or its equivalent, and to the vehicle frame respectively. A suitable guide means is provided to provide for parallelism of the seatings for the auxiliary spring means in all positions thereof.

The position of the pivot axis of the member carrying the seating for the auxiliary spring at that end thereof connected to the vehicle frame, is such that at normal load the "toggle" is straight with the auxiliary spring means exerting its maximum force which is an endwise compressive force on the leaf spring, in this "dead center" position of the toggle.

It will be apparent that bowing of the leaf spring away from its normal position cannot take place without a shortening of the distance between the two ends of the leaf spring accompanied by a swinging of the spring shackle in a direction extending the distance between the pivot points of the seatings of the auxiliary spring means and by "breaking" movement of the toggle connection away from its dead center position, to positions of increasing angularity in which the auxiliary spring exerts a lessening additional supplementary deflecting force on the leaf spring. The turning moment of the auxiliary spring pressure acting on the shackle and tending to deflect the leaf spring, is reduced and the auxiliary spring pressure is itself lessened.

The auxiliary spring expands to its free length with increasing deflections of the main suspension leaf spring and before the point of maximum upward or downward deflection thereof is reached.

Referring now to Figures 1 and 2, the seating 11 of the auxiliary coil spring 7 is pivoted to the leaf spring and the shackle by means of the shackle pin 12. The seating 13 of the auxiliary coil spring 7 is pivoted to the bracket 10 by means of a pin 14. The seatings 11 and 13 have portions telescoped one within the other to maintain the seatings in parallelism.

In the construction according to Figures 3 and 4, there is a two stage operation of the auxiliary spring constituting a so called "French stop" motion. In the first stage of deflection of the main suspension leaf spring, the auxiliary spring lengthens, exerting a lessening thrust on the shackle and the leaf spring. In the second stage of extreme deflection of the main suspension leaf spring, the thrust of the auxiliary spring is reversed to exert a pull on the shackle and the leaf spring. Since pin 47 is offset from pin 46 as shown, the expansion of spring 8 during deflection of spring 3 is modified as compared to the structure of Figures 1 and 2.

It will be appreciated that the characteristic curves of load-deflection and rate-deflection of the combination can be changed by arranging that in the construction according to Figures 1 and 2, the spring is not permitted to expand to its free length and that in the construction according to Figures 3 and 4, the second stage of operation comes into effect before the spring has expanded to its free length.

Referring now to Figures 3 and 4, the auxiliary coil spring 8 is enclosed between the walls of a tubular member 15 pivoted to the shackle 6 and the stem portion of a member 16 which is screwed into the end of a housing 17 which is pivotally connected to the bracket 10 on the vehicle frame. Shoulders 18 and 19 in the bore of the tubular member 15 and on the stem portion of the member 16, respectively serve during the first stage of operation, as abutments for thrust washers or seatings 20 and 21 respectively between which, at normal load, the spring 8 is compressed. The seating washers 20 and 21 have a sliding fit in the bore of the tubular member 15 and on the stem portion of the member 16, so that the latter is properly guided telescopically within the tubular member 15.

In the first stage of operation, the deflection of the main suspension spring is reducingly assisted and the spring 8 expands until the head 22 of the stem portion of the member 16 comes into contact with the seating washer 20. At the same time a stop ring 23 in the bore of the member 15 comes into contact with the seating washer 21.

In the second stage of deflection with farther extension of the telescopic connection between the members 15 and 16, the stops 22 and 23 serve as abutments for the seating washers 20 and 21 respectively, and the deflection of the main suspension spring is increasingly resisted. Adjustment of the spring pressure of the auxiliary spring 8 and hence the effective spring rate of the main suspension leaf spring 3 can be effected at any time by screwing the member 16 farther into, or out of, the housing 17.

As shown also in Figure 3 a hydraulic shock absorber can be embodied between the relatively movable members 15 and 16. For this reason that end of the housing 17 which is remote from the bracket 10 is connected to the member 15 through an extensible bellows portion 24. The housing can be filled with oil through a plug 25. The member 16 has been bored and counterbored to provide a passage 26 with ports 27 and 28 therefrom, into the annular chamber 29 containing the auxiliary coil spring 8 and the annular chamber 30, respectively.

The flow of fluid from the chamber 30 through the passage 26 into the chamber 29 is controlled by a valve 31 which is urged by a very light spring 32 on to a seating 33 provided by a plug 34 which seals the end of the passage 26.

The flow of fluid from the chamber 29 through the passage 26 into the chamber 30 is controlled by a valve 35 urged by a spring 36 on to a seating on the valve 31. Fluid from the chamber 29 passes through a duct 35' in the stem of the valve 35 when the valve is off its seating on the valve 31.

The transfer of fluid from the chamber 29 into the chamber 30 is restricted and this forms a hydraulic damper.

In Figure 5 the stem portion of a member 37 which is pivoted to the bracket 10 on the vehicle frame slides in the bore of a tubular member 38 which is pivoted to the shackle 6. The Belleville washer springs 9 are packed between seatings 39 and 40 respectively on the members 37 and 38 which are connected by an extensible bellows 41 enclosing the Belleville washer springs and forming a chamber which may be filled with oil.

Belleville washer springs are advantageous in the toggle spring, since such springs may be designed to have a rate which varies with deflection. Such toggle springs permit the range of the lowest rate of the whole suspension to be increased. The washers may be arranged in series and parallel as shown, to obtain the required characteristics.

A groove 42 on the stem portion of the member 37 serves to relieve the pocket 43 in the tubular member 38.

The pivot pins 44 and the shackle pins 45, 46 and 47 of Figures 3, 4, and 5, are of the type providing a screw threaded bearing. As shown, a pin 47, separate from the pin 46 of the leaf spring is provided for the connection of the tubular member to the shackle in order that adequate bearing surfaces may be provided within limited overall dimensions.

The shackle is preferably arranged at the rear end of the main suspension leaf spring, since this arrangement reduces the tension stresses when braking.

A minimum of friction and a minimum of lost motion or play between the parts of the structure is desirable, to reduce the "friction loop" at and around the normal load position of the toggle joint.

It is obvious that the invention could be adapted to use an auxiliary spring in maximum tension at normal load, in substitution for the spring in compression shown in the drawings.

Summarizing,—a suspension system according to the invention uses a minimum weight of spring metal for a given rate, because it enables a soft result to be obtained from stiff springs; it provides a soft or low rate suspension for riding comfort; it provides a spring rate increasing with deflection for roll stability, and to the extent that torsional stabilizers are dispensed with, the transmission of torsional shocks to the car produced by the bumping of one wheel is eliminated; because of its variable rate, the frequency of oscillation changes with deflection, so that there is less building up of oscillations of large magnitude; it has great resistance to braking forces, and it is adjustable.

I claim:

1. In a suspension system in which a main suspension spring is subjected to a changing load, means reducing the inherent rate of the spring in its normal load position and therefrom increasing the effective rate of the spring as the load is increased or decreased from normal and the spring is deflected from its normal position, said means including an auxiliary spring, acting on the main suspension spring through a toggle of which one link is constituted by a part which is integral with the main suspension spring.

2. In a suspension system in which a main suspension spring is subjected to a changing load, means reducing the inherent rate of the spring in its normal load position and therefrom increasing the effective rate of the spring as the load is increased or decreased from normal and the spring is deflected from its normal position, said means including an auxiliary spring, acting on the main suspension spring through a toggle of which one link is constituted by a part which is integral with the main suspension spring, the said toggle being straight in the normal position of the main suspension spring whereby the auxiliary spring exerts a maximum force assisting deflection of the main spring at or about the normal load position thereof, said auxiliary spring force becoming progressively less with increasing deflections of the main spring in either direction away from its normal load position.

3. In a suspension system in which the main suspension spring is a leaf spring subjected to a changing load, means reducing the inherent rate of the spring in its normal load position and therefrom increasing the effective rate of the spring as the load is increased or decreased from normal and the spring is deflected from its normal position, said means including an auxiliary spring acting on one end of the main suspension leaf spring which itself forms one link of a toggle which is straight in the normal load position, whereby the auxiliary spring exerts a maximum force assisting deflection of the main spring at or about the normal load position thereof, said auxiliary spring force becoming progressively less with increasing deflections of the main spring in either direction away from its normal load position.

4. In a suspension system in which a main suspension spring is subjected to a changing load, auxiliary spring means exerting a force in a direction reducing the inherent rate of the spring in its normal load position and permitting the full inherent rate of the spring to become increasingly operative as the load is increased or decreased from normal and the spring is deflected from its normal position, and stop means for the auxiliary spring whereby when the main spring has been deflected a given extent in either direction away from its normal position, the auxiliary spring means exerts a force in an opposite direction and the inherent rate of the main suspension spring is progressively augmented in value.

5. A suspension system according to claim 1 in which the auxiliary spring rate has a non-linear relation to its deflection.

6. The combination according to claim 1 in which the auxiliary spring is a coil spring.

7. The combination according to claim 1 in which the auxiliary spring is constituted by a plurality of Belleville washer springs.

8. The combination according to claim 1 in which the auxiliary spring is constituted by a series arrangement of a plurality of units of Belleville washer springs arranged in parallel.

9. The combination according to claim 1 in which the auxiliary spring means is enclosed in an extensible housing filled with oil, and hydraulic damping means are provided between the relatively movable parts thereof.

10. A vehicle suspension system according to claim 1 in which the main suspension spring is a leaf spring having one end shackled to the vehicle frame and the other end pivoted thereto, and in which the auxiliary spring is operative on the shackled end of the leaf spring which itself forms one link of the toggle.

11. A vehicle suspension system according to claim 1 in which the main suspension spring is a leaf spring having one end shackled to the vehicle frame and the other end pivoted thereto, and in which the auxiliary spring acts directly on the shackled end of the leaf spring which itself forms one link of the toggle.

12. A suspension system according to claim 1 in which the main suspension spring is a leaf spring arranged longitudinally of the vehicle, having its rearward end shackled to the vehicle frame and its forward end pivoted thereto, and in which the auxiliary spring is operative on the shackled end of the leaf spring which itself forms one link of the toggle.

13. A suspension system according to claim 1 in which the main suspension spring is a leaf spring arranged longitudinally of the vehicle, having its rearward end shackled to the vehicle frame and its forward end pivoted thereto, and in which the auxiliary spring acts directly on the shackled end of the leaf spring which itself forms one link of the toggle.

14. A vehicle suspension system according to claim 2 in which the main suspension spring is a leaf spring and the auxiliary spring is constituted by a multiplicity of Belleville washer springs in series.

15. A vehicle suspension system according to claim 3 in which the main suspension spring is a leaf spring which is substantially flat at normal load and the auxiliary spring is a coil spring in maximum compression at normal load, the leaf spring forming one link and the auxiliary spring the other link of a toggle which is straight in the normal load position.

16. The combination according to claim 4 in which the auxiliary spring means is enclosed in an extensible housing filled with oil, and hydraulic damping means are provided between the relatively movable parts thereof.

17. A suspension system according to claim 4 in which a single auxiliary spring provides a force reducing the inherent rate of the spring in its first stage of deflection and augmenting the inherent rate of the spring in its second stage of extreme deflection in either direction away from its normal load position.

18. A suspension system according to claim 4 in which the auxiliary spring exerts a force on a part whose movement is a function of the deflection of the main suspension spring, the said part forming one link of a toggle which is straight in the normal load position.

MAURICE OLLEY.